(12) United States Patent
Lundy

(10) Patent No.: US 7,099,702 B1
(45) Date of Patent: Aug. 29, 2006

(54) PORTABLE PHONE HAVING TRANSFORMABLE COMPONENTS

(75) Inventor: Michael T. Lundy, Olathe, KS (US)

(73) Assignee: Sprint Spectrum L.P., Overland Park, KS (US)

(*) Notice: Subject to any disclaimer, the term of this patent is extended or adjusted under 35 U.S.C. 154(b) by 214 days.

(21) Appl. No.: 10/687,448

(22) Filed: Oct. 16, 2003

(51) Int. Cl.
*H04M 1/00* (2006.01)
*G09G 5/00* (2006.01)

(52) U.S. Cl. ............ 455/566; 455/575.1; 455/575.3; 345/156; 345/169

(58) Field of Classification Search ............ 455/550.1, 455/515.1, 575.4, 566, 90.3, 575.8, 575.1, 455/575.2, 575.3; 379/433.13; 345/169, 345/156, 174
See application file for complete search history.

(56) References Cited

U.S. PATENT DOCUMENTS

| | | | |
|---|---|---|---|
| 6,091,815 A | 7/2000 | Ryu et al. | |
| 6,292,980 B1 | 9/2001 | Yi et al. | |
| 6,324,386 B1 | 11/2001 | Headon | |
| 6,373,501 B1 | 4/2002 | Fiero | |
| 6,438,228 B1 | 8/2002 | Jeong et al. | |
| 6,453,170 B1* | 9/2002 | List et al. | 455/550.1 |
| 6,470,175 B1 | 10/2002 | Park et al. | |
| 6,587,674 B1* | 7/2003 | Isberg et al. | 455/575.8 |
| 6,839,576 B1* | 1/2005 | Aagaard et al. | 455/575.1 |
| 6,850,784 B1* | 2/2005 | SanGiovanni | 455/575.1 |
| 6,975,724 B1* | 12/2005 | Shin | 379/433.13 |
| 2002/0061770 A1* | 5/2002 | Ozaki | 455/566 |
| 2003/0040330 A1* | 2/2003 | Kim et al. | 455/550 |
| 2003/0073462 A1* | 4/2003 | Zatloukal et al. | 455/558 |
| 2004/0203517 A1* | 10/2004 | Park et al. | 455/90.3 |
| 2004/0203522 A1* | 10/2004 | Lim | 455/90.3 |
| 2004/0203527 A1* | 10/2004 | Matsumoto | 455/90.3 |
| 2004/0204015 A1* | 10/2004 | Harmon et al. | 455/550.1 |
| 2004/0242289 A1* | 12/2004 | Jellicoe et al. | 455/575.1 |
| 2005/0070348 A1* | 3/2005 | Lee et al. | 455/575.4 |

OTHER PUBLICATIONS

Internet article "Secrets of the wireless elite: Romero's N-Gage game phone" Jul. 3, 2003.
Internet article "Nokia's convergence gamble pays off" Aug. 25, 2003.
Internet article "Motorola V70 phone for Cingular Wireless" Sep. 15, 2003.
Internet article "Samsung SPH-A600 now available through Sprint PCS" Jul. 31, 2003.
Internet article "PCS Game Pad for the Samsung A600 coming this Aug." Jul. 31, 2003.
Internet article "Pocketgear software" Jul. 6, 2001.
Internet article "NZ90 Color Clie Handheld w/ 2 mega-pixel Camera" Jan. 21, 2003.
Internet article Color Clié™ Handhelds NX Series Jan. 21, 2003.
Internet article FOMA SH2101V Videophone Jan. 21, 2003.
Internet article "Nokia 9290 Communicator" Jan. 21, 2003.

(Continued)

*Primary Examiner*—George Eng
*Assistant Examiner*—Kiet Doan

(57) ABSTRACT

A portable phone having a keypad, a display screen, and a navigational key positioned between the keypad and the display screen, where the display may be physically be moved into a position between the navigational key and the keypad to allow the phone to be transformed into a device with improved ergonomics for using the phone as a gaming device.

25 Claims, 2 Drawing Sheets

OTHER PUBLICATIONS

Internet article "Nokia 5510" Jan. 21, 2003.

Internet article "Mobile Gamers Need Better Devices" Oct. 17, 2002.

Internet article "A New Breed of Phone Emerges from Kyocera and Wildseed" Oct. 14, 2002.

Internet article Wildsee Ltd. Press Release Internet article "Wildsee Smart Skin" Jan. 21, 2003.

* cited by examiner

PORTABLE PHONE HAVING TRANSFORMABLE COMPONENTS

BACKGROUND OF INVENTION

1. Field of Invention

The present invention is directed to a portable phone and more particularly to a portable phone allowing for relative movement of components.

2. Background of the Invention

The use of portable phones has increased greatly over the last several years. In fact, portable phones are now used for a number of purposes beyond simply having a telephone conversation. For example, portable phones are now used to send text messages, to send e-mails, to browse the web, and to play games. At the same time, handheld gaming products and software have become increasingly popular. As a result, portable phones have been adapted to support gaming and gaming software. Many phones are equipped with Java Virtual machines that allow them to download and play games. A typical portable phone has a keypad, a display screen, and a navigational key positioned between the keypad and the display screen. The typical arrangement of the keypad, navigational key, and display screen is not ideal for many gaming applications. The close proximity of the traditional keypad and navigational key can be tedious and cumbersome to use for playing the various games now available on portable phones. This layout makes two-hand operation cumbersome and obstructs a user's view of the screen.

In addition, in some gaming applications, it useful to have a display screen positioned between the navigational key and the keypad, while in others it may be useful to have a display screen positioned generally above and centered between the navigational key and the keypad. The GameBoy device available from Nintendo is an example of a handheld gaming device having various configurations with the display centrally positioned between activation keys to facilitate two-hand operation. The typical arrangement of a standard portable phone does not provide the same ergonomics as a GameBoy or other handheld gaming device where the display is not centered between the activation keys. As a result, an attachable game controller has been developed for attachment to a portable phone to allow users to play games with their standard portable phone. One such device is known as the PCS Game Pad for use with the Samsung A600 portable phone providing control keys on both sides of the portable phone. While a useful device, the use of the Game Pad requires a user to carry both the standard portable phone and the Game Pad to achieve enhanced gaming abilities. It takes up a lot of space and is cumbersome to carry both the portable phone and an attachable game controller. Oftentimes it is impractical to carry both a phone and a separate game controller, and even when practical, the game controller may frequently be inadvertently left behind.

Accordingly, there is a need to provide a portable phone that allows for relative movement of one or more of the display screen, navigational key, and keypad to allow for improved ergonomics for gaming and other applications, without the need for an attachable game controller.

SUMMARY OF THE INVENTION

In the present embodiments, one embodiment is directed to a portable phone having a navigational key positioned between a display screen and a keypad where the display screen is adapted to pivot (preferably about 90 degrees) about the phone housing to allow the display screen to be positioned to the side of the navigational key and the keypad. In addition, the keypad and/or navigational key may be extendable from the housing to allow for more ideal positioning of the navigational key and keypad for gaming applications.

In another embodiment, a portable phone is normally in a first configuration wherein the navigational key is positioned between the keypad and the display screen. The navigational key and display screen are both rotatably mounted to the phone housing such that they can be rotated generally 180 degrees to allow the display screen to be positioned between the navigational key and the keypad. In this embodiment, the keypad and/or navigational key may be extendable from the housing to allow for more ideal positioning of the navigational key and keypad for gaming applications. In this embodiment, the display screen may be switched from landscape viewing to portrait viewing to support gaming applications.

The present invention provides a portable phone that allows for relative positioning and movement of one or more of the display screen, navigational key, and keypad to allow for improved ergonomics for gaming and other applications, without the need for an attachable game controller.

BRIEF DESCRIPTION OF THE DRAWINGS

Further advantages of the present invention will become apparent to those skilled in the art with the benefit of the following detailed description of the preferred embodiments and upon reference to the accompanying drawings in which:

FIG. 3b is a side view of the phone of FIG. 3a;

Figure 1:
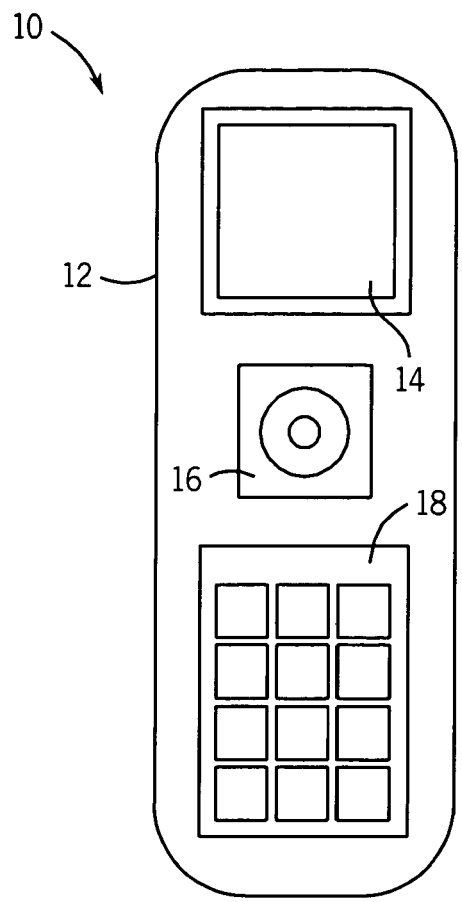
FIG. 1 is a top view of a portable phone having a conventional layout of the display screen, navigational key, and keypad.

While the invention is susceptible to various modifications and alternative forms, specific embodiments thereof are shown by way of example in the drawings and will herein be described in detail. It should be specifically understood with respect to the drawings, that the drawings are of preferred embodiments, and there are many other embodiments and forms in which the present invention may appear. It should also be understood that the drawings and detailed description thereof are not intended to limit the invention to the particular form disclosed, but on the contrary, the invention is to cover all modifications, equivalents and alternatives falling within the spirit and scope of the present invention or within the scope of the appended claims.

DETAILED DESCRIPTION OF PREFERRED EMBODIMENTS

With reference to FIG. 1, an illustrative portable phone 10 is shown having a conventional arrangement of display screen 14, navigational key 16, and keypad 18 on phone housing 12. The display screen 14 may be of any conventional type including color or monochromatic. The navigational key 16 is typically a four-position (up, down, conventional manner, wherein pressure on the left or right side of the key moves a cursor on the display to the left or right respectively, pressure on the top or bottom of the key moves the cursor on the display up or down respectively, and pressing the center of the key serves as an entry command. This type of navigational key is commonly used in portable phones to allow a user to scroll up or down, move to the right or left, and ultimately select with the control activation key. The present invention contemplates the use of this type of navigational key, but is in no way limited to this particular type of navigational key. Other types of navigational keys having additional (or fewer) positions, or even multiple keys may also be used, and are also within the scope of the invention. The keypad 18 is shown as a conventional numeric keypad commonly used on portable phones, having digits 0–9, and a star key "*" and a pound key "#," although the present invention is in no way limited to this type of a keypad. Other keypads including those having more (or fewer) keys, or a virtual keyboard, may also be used, and are within the scope of the invention. In addition, the keypad 18 may be a virtual keypad appearing on a display. The phone housing can be made using conventional manufacturing methods, including molding and forming of plastic, and further may house conventional telephone circuitry.

Figure 2:
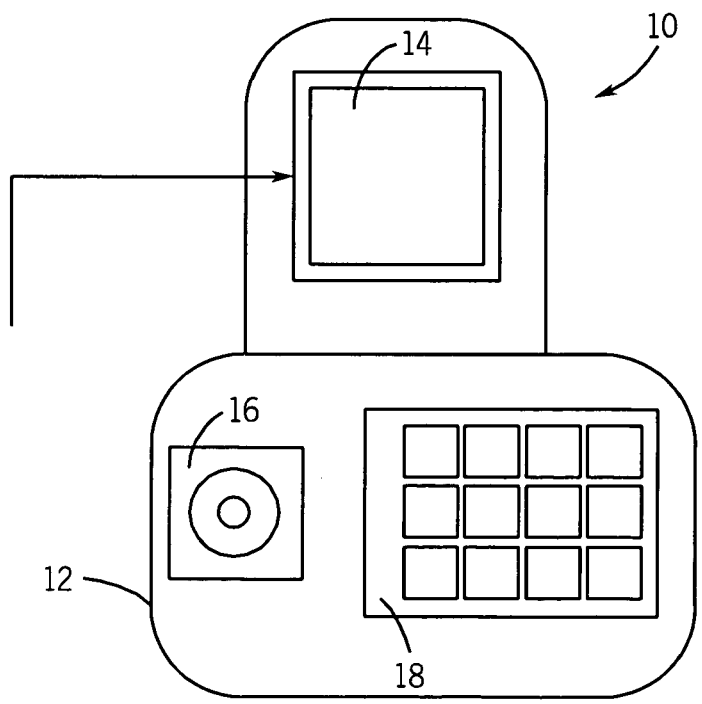
FIG. 2 is a top view of the phone of FIG. 1 showing the display screen rotated 90 degrees and positioned above and centered between the navigational key and keypad.
Figure 4:
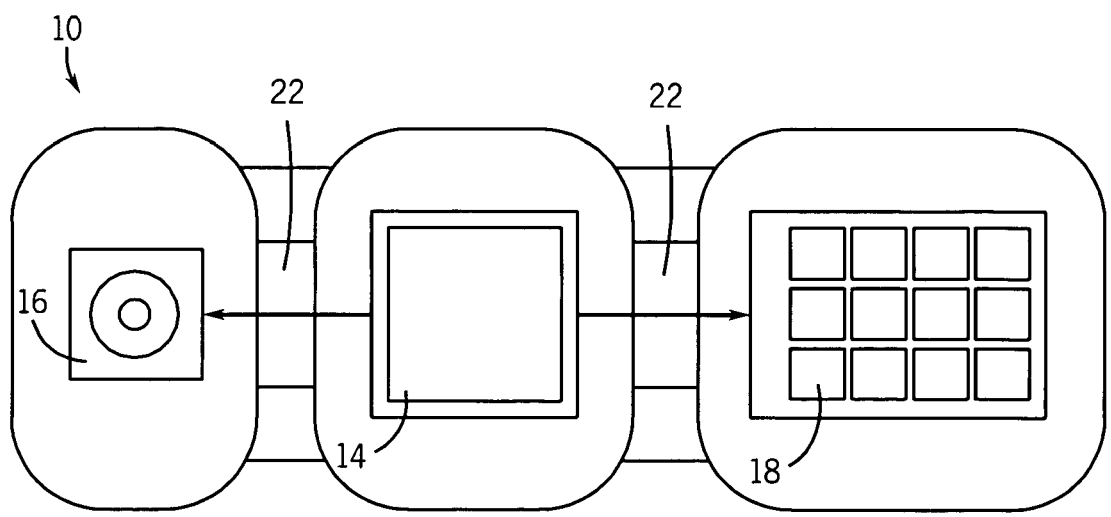
FIG. 4 is a top view of the phone of FIG. 3a, showing the navigational key and keypad in extended positions.

FIG. 2 shows portable phone 10 where the display screen 14 has been rotated about the phone housing 12 from a first position denoted with dotted lines to a second position in which the display screen 14 is positioned to the side of the navigational key 16 and keypad 18. Preferably, when a user holds the phone 10 with the left thumb on the navigational key 16 and the right thumb on the keypad 18, the display screen 14 is centered between the user's hands to better facilitate the gaming experience. The display screen 14 can preferably be mounted to the housing using a conventional pivot arrangement as is known in the art. As an example, the display may pivot about a pivot point and a circular slide switch used to provide any necessary electrical connections. A combination mechanical arm and slide mechanism could also be used. As shown in FIG. 2, the entire upper portion of the phone housing on which the display screen 14 is positioned is movable from a first position to the second position. However, it is also envisioned that only the display screen, or less then the entire top portion of the housing, would be rotated from the first position to the second position. In addition, in the same manner as depicted in FIG. 4, either or both the navigational key 16 and the keypad 18 may be extendable from the phone housing 12 to provide a greater distance between the two and to facilitate better two-hand operation. It will be appreciated that in FIGS. 1 and 2, the navigational key in the normal, first position is positioned between the display screen and the keypad. However, it is also within the scope of the invention to have the keypad positioned between the display screen and navigational key. In this scenario, the display still may rotate 90 degrees from the housing.

Figure 3A:
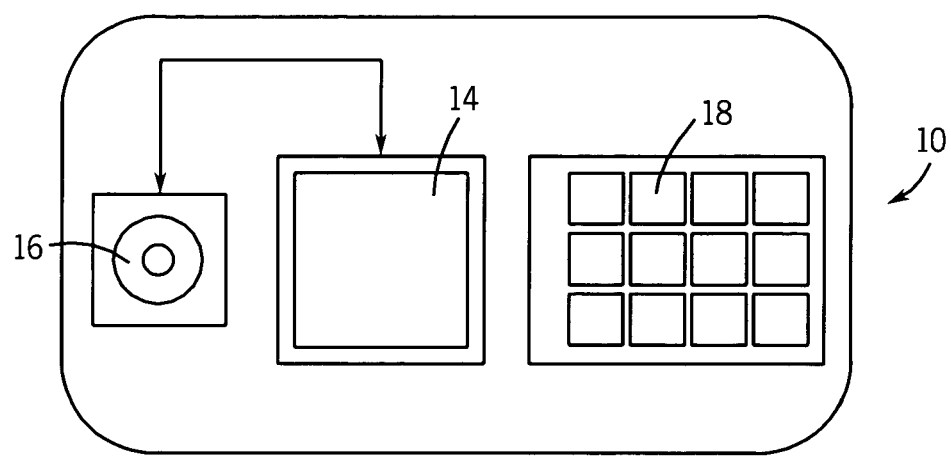
FIG. 3a is a top view of the phone of FIG. 1, where the navigational key and display screen have been rotated 180 degrees.
Figure 3B:
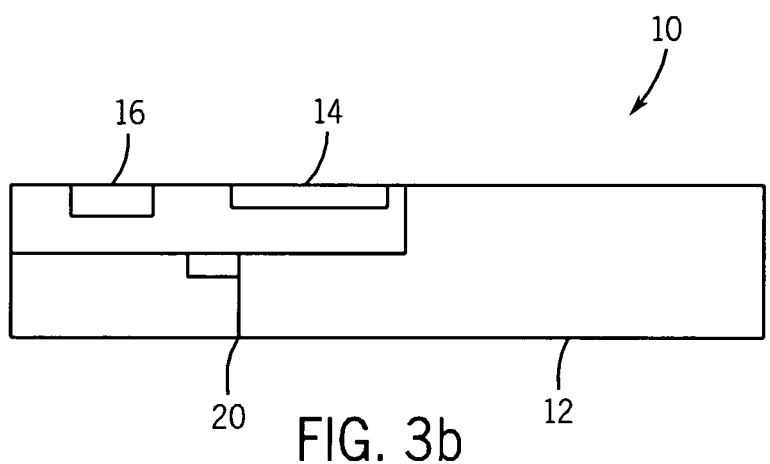

FIGS. 3*a*–3*b* show an alternate embodiment of a portable phone 10. In this embodiment, the navigational key 16 and the display screen 14 are rotatably mounted about the phone housing 12, such that they are both rotatable 180 degrees from a conventional configuration as shown in FIG. 1. Thus, for gaming applications the display screen 14 and the navigational key 16 can "switch places" to allow the conventional phone to be transformed into a device more suitable for gaming applications. Preferably, both the navigational key 16 and the display screen 14 are pivotally mounted to a pivot 20 located on the phone housing 12. The navigational key 16 and display screen 14 may pivot about pivot 20 in a conventional manner. As an example, the navigational key 16 and display screen 14 may pivot about a pivot point and a circular slide switch may be used to provide any necessary electrical connections. This configuration allows the phone to be transformed into a more suitable gaming device while retaining the same size as a conventional phone.

Once rotated, the navigational key 16 and display screen 14 may be retained in position by a suitable locking mechanism, such as a conventional detent and corresponding protrusion, or even a ratchet and pawl indexing mechanism. Alternately, the navigational key and display screen could be pulled in an upward direction, away from the phone housing, to release a detect or retention pin. In the upward position, the navigational key and display are free to rotate. After rotating 180 degrees, the navigational key and display screen could be pushed downward into a flush position with the phone housing, where the detent or retention pin is placed into a corresponding retention pin opening positioned 180 degrees from the original position. A hasp or clasp could be used as well. Alternately, the navigational key 16 and display screen 14 could be locked in position by means of a detent or retention pin positioned above the keypad and extending in an axial direction towards the navigational key 16 and display screen 14. The keypad 18 could be extended away from the navigational key 16 and display screen 14 (see FIG. 4) to release the retention pin and allow for rotation, and then moved back into its original position to once again serve as a lock against undesired rotation. It will also be appreciated that in FIGS. 3 and 4, the navigational key in the normal, first position is positioned between the display screen and the keypad. However, it is also within the scope of the invention to have the keypad positioned between the display screen and navigational key. In this scenario, the display screen and keypad will rotate 180 degrees about the housing.

FIG. 4 shows the phone 10 of FIGS. 3*a*–3*b* with the display screen 14 rotated into position between navigational key 16 and keypad 18. The keypad 18 is shown extending from the display screen 14. The keypad 18 may include a slide 22 adapted to cooperate with a corresponding slideway in the phone housing 12 to allow the keypad to be extended from the display screen 14 to provide for improved ergonomics and to facilitate better two-hand operation by the user. Likewise, the navigational key 16 may also include a slide 22 adapted to cooperate with a corresponding slideway in the phone housing 12 to provide for improved ergonomics and to facilitate better two-hand operation by the user.

What is claimed is:

1. A portable phone comprising:
   a housing having a top portion and a bottom portion;
   a keypad positioned on the bottom portion of the housing;
   a display screen positioned in a first position generally above the keypad on the top portion of the housing;
   and a navigational key positioned on the housing between the display screen and the keypad; wherein the display screen is rotatable from the first position to a second position where the display screen is positioned generally to the side of the keypad and navigational key; and the keypad is axially extendable from the navigational key from the bottom portion of the housing to provide a greater distance between the keypad and the navigational key; wherein
   the display screen rotates at least 90 degrees from the first position to the second position, and wherein
   the display screen pivots in relation to the housing so that when the display screen and the navigation key switch places, the display screen is rotated generally 180 degrees to allow the display screen to be generally centered between the navigational key and the keypad.

2. The phone of claim 1, wherein the display screen in the second position is positioned generally to the right of the keypad and the navigational key.

3. The phone of claim 1, wherein the keypad is extendable from the navigational key to provide a geometry having improved gaming characteristics.

4. The phone of claim 1, wherein the housing includes a slideway adapted for cooperation with a slide positioned on a bottom surface of the keypad to facilitate the extension of the keypad.

5. The phone of claim 1, further including means for extending the keypad from the navigational key when the display screen is in the second position.

6. A portable phone comprising:
a housing having a top portion and a bottom portion;
a keypad positioned on the bottom portion of the housing;
a display screen positioned in a first position generally above the keypad on the top portion of the housing;
and a navigational key positioned on the housing between the display screen and the key pad; wherein the display screen and navigational key are both rotatable 180 degrees around a pivot from a first position, where the navigational key is located between the display screen and the keypad to a second position wherein the display screen is located between the navigational key and the keypad, wherein
the display screen and navigational key pivot around a pivot point on the housing so that when the display screen and navigational key are in the second position, the display screen is generally centered between the navigational key and the keypad.

7. The phone of claim 6, wherein the keypad is axially extendable from the display screen when the display screen is in the second position.

8. The phone of claim 7, wherein the navigational key is also axially extendable from the display screen when the display screen is in the second position.

9. The phone of claim 7, wherein the housing includes a slideway adapted for cooperation with a slide positioned on a bottom surface of the keypad to facilitate the extension of the keypad.

10. The phone of claim 6, wherein the navigational key is axially extendable from the display screen when the display screen is in the second position.

11. The phone of claim 6, wherein the keypad and navigational key are both axially extendable from the display screen to provide a geometry having improved gaming characteristics.

12. The phone of claim 6, further including means for axially extending the keypad from the housing when the display screen and navigational key are in the second position.

13. The phone of claim 12, further including means for axially extending the navigational key from the display screen when the display screen and navigational key are in the second position.

14. The phone of claim 6, further including means for axially extending the navigational key from the display screen when the display screen and navigational key are in the second position.

15. A portable phone comprising:
a housing having a top portion and a bottom portion;
a navigational key positioned on the bottom portion of the housing;
a display screen positioned in a first position generally above the navigational key on the top portion of the housing;
and a keypad positioned on the housing between the display screen and the navigational key; wherein the display screen is rotatable from the first position to a second position where the display screen is positioned generally to the side of the keypad and navigational key, and wherein the navigational key is axially extendable from the keypad when the display screen is in the second position, wherein
the display screen rotates at least 90 degrees from the first position to the second position, and wherein
the display screen pivots in relation to the housing so that when the display screen and the keypad switch places, the display screen is rotated generally 180 degrees to allow the display screen to be generally centered between the navigational key and the keypad.

16. The phone of claim 15, wherein the display screen in the second position is positioned generally to the right of the keypad and the navigational key.

17. The phone of claim 15, wherein the keypad is axially extendable from the navigational key to provide a geometry having improved gaming characteristics.

18. The phone of claim 15, wherein the housing includes a slideway adapted for cooperation with a slide positioned on a bottom surface of the navigational key to facilitate the extension of the navigational key.

19. A portable phone comprising:
a housing having a top portion and a bottom portion;
a navigational key positioned on the bottom portion of the housing;
a display screen positioned in a first position generally above the navigational keys on the top portion of the housing;
and a keypad positioned on the housing between the display screen and the navigational key, wherein the display screen and keypad are both rotatable 180 degrees around a pivot from a first position, where the keypad is located between the display screen and the navigational key, to a second position where the display screen is located between the navigational key and the keypad, wherein
the display screen and keypad pivot around a pivot point on the housing so that when the display screen and keypad are in the second position, the display screen is generally centered between the navigational key and the keypad.

20. The phone of claim 19, wherein the navigational key is axially extendable from the display screen when the display screen is in the second position.

21. The phone of claim 20, wherein the keypad is also axially extendable from the display screen when the display screen is in the second position.

22. The phone of claim 20, wherein the housing includes a slideway adapted for cooperation with a slide positioned on a bottom surface of the navigational key to facilitate the extension of the navigational key.

23. The phone of claim 19, wherein the keypad is axially extendable from the display screen when the display screen is in the second position.

24. The phone of claim 19, wherein the keypad and navigational key are both axially extendable from the display screen to provide a geometry having improved gaming characteristics.

25. The phone of claim 19, further including means for axially extending the navigational key from the housing when the display screen and keypad are in the second position.

* * * * *